(12) United States Patent
Weinert

(10) Patent No.: US 7,924,538 B2
(45) Date of Patent: Apr. 12, 2011

(54) SELF-PROTECTING CROWBAR

(75) Inventor: Hans-Christian Weinert, Bochum (DE)

(73) Assignee: Werner Turck GmbH & Co. KG (DE)

( * ) Notice: Subject to any disclaimer, the term of this patent is extended or adjusted under 35 U.S.C. 154(b) by 494 days.

(21) Appl. No.: 11/941,700

(22) Filed: Nov. 16, 2007

(65) Prior Publication Data

US 2009/0262473 A1  Oct. 22, 2009

(30) Foreign Application Priority Data

Nov. 17, 2006 (DE) .......................... 10 2006 054 354

(51) Int. Cl.
*H02H 9/02* (2006.01)
(52) U.S. Cl. ........................................................ 361/56
(58) Field of Classification Search .................... 361/54, 361/56, 57
See application file for complete search history.

(56) References Cited

U.S. PATENT DOCUMENTS

| 3,475,653 | A | * | 10/1969 | Jameson et al. | 361/55 |
| 3,539,865 | A | * | 11/1970 | Billings | 361/55 |
| 4,536,699 | A | * | 8/1985 | Baker | 323/276 |
| 5,959,816 | A | * | 9/1999 | Wood et al. | 361/18 |
| 2004/0004404 | A1 | * | 1/2004 | Eckardt et al. | 307/140 |

FOREIGN PATENT DOCUMENTS

| DE | 1 936 278 | 5/1970 |
| DE | 110 983 | 1/1975 |
| DE | 40 00 674 | 8/1990 |
| DE | 19945869 A1 | 12/2001 |
| DE | 10 2004 025 420 | 12/2005 |
| DE | 10 2006 003 620 | 8/2007 |

* cited by examiner

*Primary Examiner* — Jared J Fureman
*Assistant Examiner* — Ann T Hoang
(74) *Attorney, Agent, or Firm* — St. Onge Steward Johnston & Reens LLC

(57) ABSTRACT

The invention relates to a protective circuit for an electrical device operated in particular in an explosion-hazard area, with a limiting circuit connected downstream of a pair of input terminals for limiting an output voltage present at a pair of output terminals and/or an output current delivered at the output terminals below a threshold value and a shorting circuit, which shorts the output or input terminals when a threshold value is exceeded, the control signal that controls the limitation originating from the same place as the signal that triggers the shorting circuit, and with a measuring circuit, which uses the output voltage or the output current to provide a control signal, which is fed on the one hand to a final control element for reducing the output voltage or the output current and on the other hand to the shorting circuit, the measuring circuit comprising a ZENER diode and/or a measuring resistor and the control signal being a voltage that is in particular a transistor-amplified or impedance-converted voltage. To minimize the difference between the guaranteed output voltage and the safety voltage, the invention proposes that the final control element is a self-conducting field-effect transistor, at the gate of which the control signal is present, and the measuring circuit is connected downstream of the field-effect transistor in the direction of current flow.

14 Claims, 3 Drawing Sheets

SELF-PROTECTING CROWBAR

CROSS-REFERENCE TO RELATED APPLICATIONS

The present application claims priority of German Patent Application No. 10 2006 054 354.8-34 filed on Nov. 17, 2006, the content of which is incorporated herein by reference.

FIELD OF THE INVENTION

The invention relates to a protective circuit for an electrical device operated in particular in an explosion-hazard area, with a limiting circuit connected downstream of a pair of input terminals for limiting an output voltage present at a pair of output terminals and/or an output current delivered at the output terminals below a threshold value and a shorting circuit, which shorts the output or input terminals when a threshold value is exceeded, the control signal that controls the limitation originating from the same place as the signal that triggers the shorting circuit, and with a measuring circuit, which uses the output voltage or the output current to provide a control signal, which is fed on the one hand to a final control element for reducing the output voltage or the output current and on the other hand to the shorting circuit, the measuring circuit comprising a ZENER diode and/or a measuring resistor and the control signal being a voltage that is in particular a transistor-amplified or impedance-converted voltage.

BACKGROUND OF THE INVENTION

A circuit of this type is already known from DD 110983. The circuit has input terminals. Connected in series between the two input terminals are a resistor and a ZENER diode. A measuring voltage, to which the output voltage of the circuit is to be controlled, is picked off at the ZENER diode by means of a potentiometer. The control takes place by means of a voltage-discriminator transistor, the emitter voltage of which is at the base of a transistor, which drives a Darlington transistor arrangement. The measuring circuit lies here upstream of the final control element formed by the Darlington circuit in the direction of current flow. Connected downstream of the final control element in the direction of the current is a shorting circuit, which comprises a thyristor which shorts the output terminals when a predetermined output voltage is exceeded.

DE 4000674 A1 describes a "crowbar", in which a voltage is picked off at two output terminals. If said voltage exceeds a threshold value, here too the thyristor is triggered, which causes a short-circuit.

DE 1936278 describes a shorting circuit with a trigger voltage generator.

A further shorting circuit is described by DE 102004025420 A1. There, a fuse is provided between a pair of input terminals and a pair of output terminals. Downstream of the fuse in the direction of the current there is a thyristor between the output terminal and the input terminal. This is triggered if either the output voltage or the output current exceeds a permissible threshold value. With the triggering of the thyristor, the output terminals are shorted. The resultant abruptly increased current causes the fuse to blow.

DE 102006003620, which is not a prior publication, describes a similar power limiting circuit. The threshold voltage is defined here by the breakdown voltage of a ZENER diode, which with a resistor forms a voltage divider bridge, which is used to pick off the trigger voltage for a thyristor which triggers in the case of a threshold current or a threshold voltage being exceeded at a measuring resistor and consequently causes a short-circuit, which results in blowing of the fuse.

To avoid a reversible or irreversible triggering of this aforementioned crowbar circuit, in the prior art control devices are connected upstream of the crowbar circuit. Typically, an electronic voltage or current limitation or voltage-current control is connected upstream of the crowbar, in order to limit the monitored voltage or the monitored current to a value below the threshold value of the crowbar. It is intended in this way to limit the voltage present at the crowbar or the current flowing through the crowbar to values that lie below the threshold value of the crowbar.

The threshold value of the crowbar is subject to tolerances, which depend for example on the breakdown voltage of the ZENER diode used. The switching threshold of the controlling or limiting circuit must lie below the minimum tolerance value to ensure that the monitored voltage can never reach the crowbar threshold value. The switching threshold of the control is likewise subject to component tolerances. Here, too, a ZENER diode is suitable as a threshold-defining component. The tolerances of the limiting circuit and the tolerances of the shorting circuit are independent of one another. This has the result that the overall tolerance range of the limiting circuit must be at a discrete interval from the tolerance range of the shorting circuit. This in turn has the consequence that the guaranteed output voltage that is present at the output terminals of a protective circuit according to the prior art is much lower than the permissible safety voltage that must not be exceeded as an output voltage.

It is therefore an object of the invention to provide measures by which the difference between the guaranteed output voltage and the safety voltage can be minimized.

SUMMARY OF THE INVENTION

The object is achieved by the invention specified in the claims.

As in the case of the prior art cited at the beginning, the control signal effecting the limitation originates from the same place as the signal triggering the shorting circuit. According to the invention, the final control element is a self-conducting field-effect transistor, at the gate of which the control signal is present. The measuring circuit is connected downstream of the field-effect transistor in the direction of current flow. The measuring circuit therefore lies here between the final control element and the output terminals or between the final control element and the shorting circuit. According to the invention, the measuring of the output voltage to be controlled takes place on the output side of the field-effect transistor. The solution according to the invention is distinguished by a pair of input terminals and a pair of output terminals, disposed between which are not only a limiting circuit and a shorting circuit but also additionally a measuring circuit, which uses the output voltage or the output current to produce a control signal. This control signal serves not only for operating the limiting circuit but also for operating the shorting circuit. It is on the one hand fed to a final control element for reducing the output voltage or the output current when the output current or the output voltage approaches the respective threshold value. On the other hand, this control signal is passed on to the shorting circuit, which triggers when the output voltage or the output current exceeds the threshold value. Here, too, the measuring circuit may comprise a ZENER diode and/or a measuring resistor. According to the invention, these measuring elements lie between the self-conducting field-effect transistor and the shorting circuit or between the field-effect transistor and a trigger voltage generator, that is to say downstream of the field-effect transistor when seen in the direction of current flow. The ZENER diode serves for determining the output voltage or for fixing its threshold value. The measuring resistor serves for determining the output current. It is preferably connected in series in the output circuit. The voltage drop across it is measured there. This can produce the control signal. The measuring circuit may form an impedance converter or a transistor amplifier. The input voltage for the measuring circuit may be picked off at a voltage divider bridge, which comprises a resistor and a ZENER diode. The impedance conversion or amplification takes place by means of a transistor connected in a current-amplifying or voltage-amplifying manner. The collector voltage of this transistor provides the gate voltage of a self-conducting field-effect transistor forming the final control element. Depending on the type of transistor used, the gate/source threshold of this transistor usually lies between −1 volt and −10 volts. The control transistor forming the final control element consequently already blocks when the breakdown voltage of the ZENER diode of the measuring circuit is slightly exceeded. A trigger voltage generator is preferably provided, supplying the shorting circuit, which may comprise a thyristor, with a trigger current when the control signal at the input there exceeds a predetermined threshold value. The trigger voltage generator is disposed between the output voltage of the final control element, that is to say the self-conducting field-effect transistor, and the pair of output terminals. It only produces a trigger voltage if the control signal exceeds a threshold value derived from this input voltage reduced by the final control element. Here, too, the threshold value is determined by a ZENER diode associated with the trigger voltage generator. This ensures that, at least in the static case, the limiting device and the shorting circuit do not simultaneously come into effect. To prevent triggering of the shorting circuit when pulsating currents or voltages exceed the threshold current or threshold voltage, delay elements are provided. These are preferably lowpass filters, which are formed by an RC element. An RC element of this type may be disposed between the measuring circuit and the trigger voltage generator, but also between the trigger voltage generator and the shorting circuit. A steeply rising edge of the control signal is consequently smoothed when it is passed on to the trigger voltage generator. Voltage peaks of the control signal are thereby cut off. Similarly, steeply rising trigger voltages are smoothed, so that the shorting circuit is only triggered if there is a defect in the limiting circuit. In this case, as in the case of the prior art, a thyristor disposed between the two output terminals triggers as a result of the trigger voltage that is produced by the trigger voltage generator and reaches a corresponding level. The short-circuit results in blowing of a fuse. In the case of a fusible link, the protective circuit goes irreversibly into the protective state. In the case of for example an electromagnetic circuit, the protective circuit goes reversibly into the protective position. In the case of the previously described solution for achieving the object, the control signal was usually an amplified measuring signal. The voltage drop across a resistor connected in series with the ZENER diode comes into consideration in particular as the measuring signal. This voltage only has a value other than zero if the voltage present at the output terminals is greater than the ZENER voltage of the ZENER diode. In a variant of the invention, this voltage is used as the control signal. It is also provided in the case of this variant that the final control element, that is to say the field-effect transistor, is driven by an amplified control signal. The unamplified control signal is not only picked off from the input of the amplifier circuit. A diode connected in the conducting direction is also subjected to the control signal. The diode is part of the trigger generator. If the voltage present at the output terminals exceeds the sum of the ZENER voltage and the voltage of the PN junction of the diode, a voltage of a value other than zero is present at a resistor connected in series with the diode. If this voltage reaches the trigger voltage of the thyristor forming the shorting circuit, the short-circuit takes place. Also in the case of this solution, a single ZENER diode is the provider of a value that determines both the shorting voltage and the limiting voltage. The value of the shorting voltage is greater than the value of the limiting circuit by the voltage drop across the diode.

BRIEF DESCRIPTION OF THE DRAWINGS

Exemplary embodiments of the invention are explained below on the basis of accompanying drawings, in which.

DETAILED DESCRIPTION OF THE INVENTION

Figure 1:
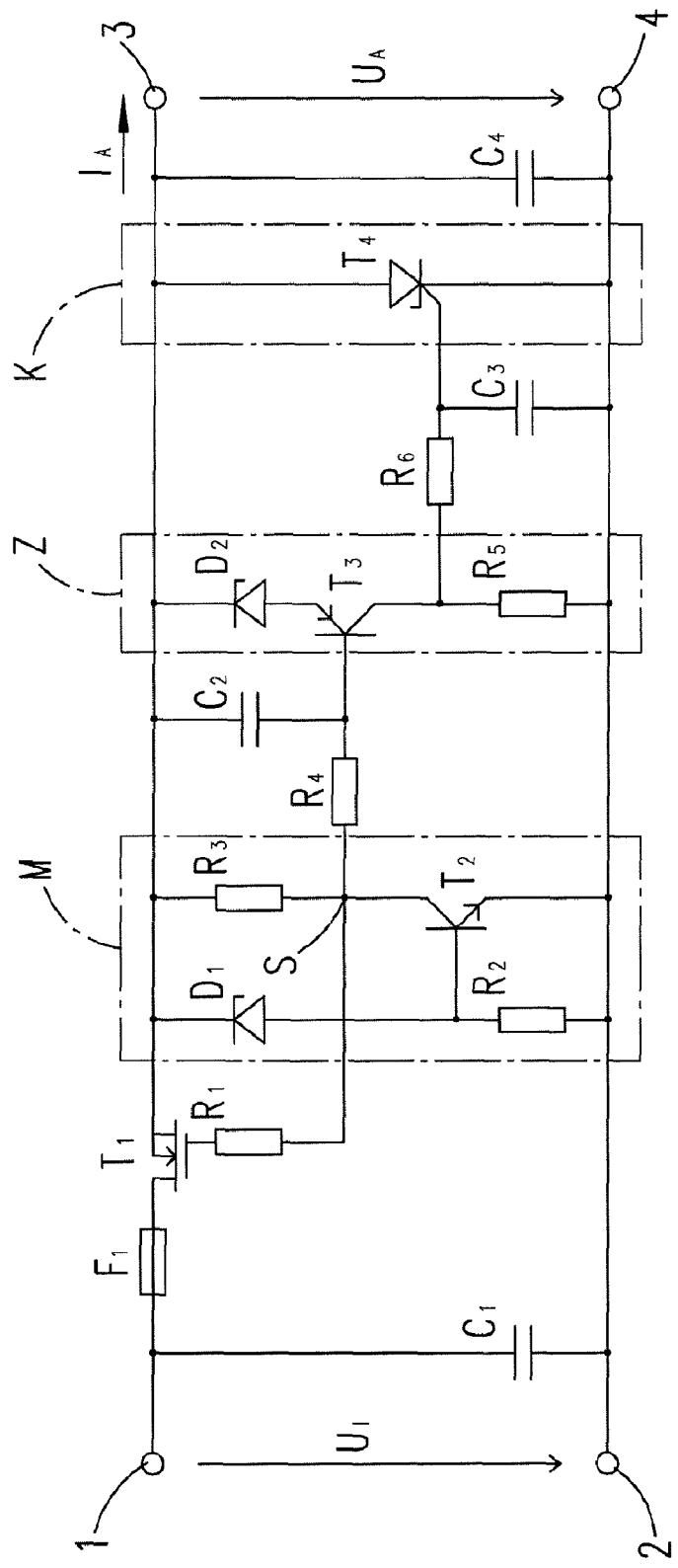
FIG. 1 shows the circuit diagram of a first exemplary embodiment.
Figure 2:
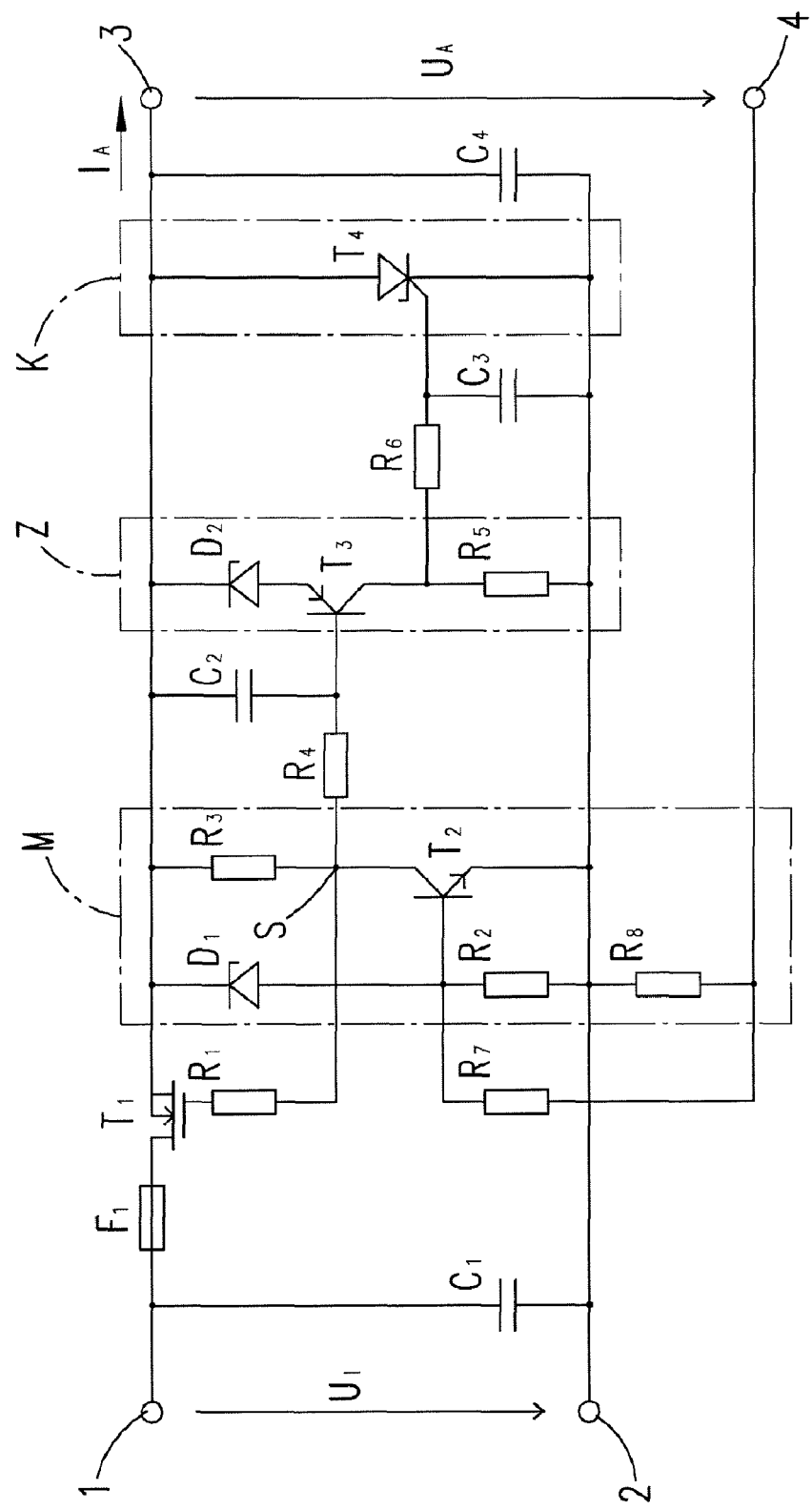
FIG. 2 shows the circuit diagram of a second exemplary embodiment.

In the case of the exemplary embodiments represented in FIGS. 1 and 2, the input is in each case designated by input terminals 1 and 2 and the output is designated by output terminals 3 and 4. An input voltage $U_I$ is present at the input terminals 1, 2. For smoothing the DC input voltage, a capacitor C1 is disposed between the input terminals 1, 2. Connected directly downstream of the capacitor C1 in the direction of the current is a fusible link F1 or an automatic fuse, which blows when a limiting current is exceeded. Serving for limiting the output voltage $U_A$ delivered at the output terminals 3, 4 or the output current $I_A$ flowing there is a final control element, which is formed by a self-conducting field-effect transistor T1. As long as the gate voltage at the transistor T1 is zero, the transistor T1 conducts. If the gate voltage of the transistor T1 falls below a gate/source threshold, which typically lies between −1 volt and −10 volts, the transistor T1 blocks.

Connected downstream in the direction of current flow, the protective circuit has a measuring circuit M. This measuring circuit serves for determining a control signal S. In the case of the exemplary embodiment represented in FIG. 1, the control signal S is intended to depend on the value of the output voltage $U_A$ and, in the case of the exemplary embodiment represented in FIG. 2, it is intended to depend additionally on the value of the output current $I_A$.

In the case of the exemplary embodiment represented in FIG. 1, located downstream of the transistor T1, between the output terminals 3, 4, is a bridge formed by a resistor R2 and a ZENER diode D1. The bridge voltage is at the base of a transistor T2, in the collector circuit of which a resistor R3 is disposed. The emitter of the transistor T2 is at the line at negative potential connecting the input terminal 2 to the output terminal 4. The collector of the transistor T2 is connected via the resistor R3 to the other line, which is at positive potential. An amplified signal is present at the collector of the transistor T2. If the output voltage $U_A$ is below the breakdown voltage of the ZENER diode D1, the potential of the base of the transistor T2 is at the potential of the emitter. The transistor T2 blocks. The control signal S is equal to zero. The transistor T1 conducts. As soon as the output voltage $U_p$, exceeds the breakdown voltage of the ZENER diode D1 plus the base-emitter voltage of T2, the transistor T2 becomes conductive, with the consequence that the control signal S is other than zero. It is present via the resistor R1 at the gate of the transistor T1. The changing gate voltage has the effect that the control transistor T1 begins to block. The voltage $U_A$ present at the output terminals 3, 4 or the current $I_A$ drawn off there falls.

The transistor T2, becoming conductive, drives the transistor T3 of a trigger voltage generator Z via the resistor R4. If the control signal S has the value zero, the transistor T3 blocks, so that the potential of the collector of the transistor T3 is at the potential of the line between the input terminal 2 and the output terminal 4. Between the emitter of the transistor T3 and the line between the control transistor T1 and the output terminal 3 there is a further ZENER diode D2, which is connected in the blocking direction. The transistor T3 only becomes conductive if the control signal S exceeds the breakdown voltage of the ZENER diode D2, that is to say the control voltage assumes a correspondingly negative value. Only then is the value of the trigger voltage provided by the collector of the transistor T3 greater than the potential that is present at the line 2, 4.

The two output terminals 3, 4 are connected to a smoothing capacitor C4. Parallel to the smoothing capacitor there is a normally blocking thyristor T4. The thyristor T4 lies between the control transistor T1 and the input terminal 2. If the trigger voltage provided by the trigger voltage generator Z exceeds the voltage required for triggering the thyristor, the thyristor T4 instantaneously becomes conductive. A very high current flows through it, which causes the fuse F1 to blow.

The dimensioning of the previously described electronic components is chosen such that, when the measuring circuit M and the control transistor T1 are working properly, the control voltage S present at the trigger voltage generator Z, and in particular at the base of the transistor T3 there, is always less than the breakdown voltage of the ZENER diode D2. The dimensioning is therefore performed in such a way that the output voltage $U_A$ is always controlled by the final control element D1 to values at which the control voltage S is lower than the breakdown voltage of the ZENER diode D2. In the event of a defect of the final control element T1, however, the shorting circuit K can be triggered. This is so because, if the transistor T2 becomes conductive in the event of an output voltage exceeding its threshold, it in turn drives the transistor T3. The transistor T3 consequently likewise becomes conductive. The voltage at the resistor R5 or at the gate of the thyristor T4 increases. As soon as this voltage exceeds the trigger voltage of typically 0.8 volt, the thyristor is triggered. The gain factors of the transistor T2 and the transistor T3 cause the triggering through-connection of the transistor T3.

In the normal case, the driving of the limiting transistor T1 takes place in principle in a way similar to the triggering of the switching operation of the shorting circuit K, which corresponds to a classic crowbar circuit, that is to say by the through-connection of the transistor T2. This is triggered by the breakdown voltage of the ZENER diode D1 being exceeded. As soon as the transistor T2 is connected through, the gate/source voltage at the control transistor T1 falls below 0 volt. Since this transistor is a field-effect transistor with enhancement characteristics, the originally conductive transistor T1 begins to block when the value falls below its gate/source threshold. Since this gate/source threshold typically lies between −1 volt and 10 volts, the transistor T1 already blocks before the breakdown voltage of the ZENER diode D2 is exceeded, and consequently before the thyristor T4 is triggered.

In order to prevent the thyristor T4 of the crowbar circuit from triggering even though the electronic voltage control T1 and M is in operation, it must be ensured that the voltage at the ZENER diode D2 of the trigger voltage generator Z never exceeds the breakdown voltage of D2 either under static conditions or under dynamic conditions. This is so since, only when the breakdown voltage of D2 is exceeded, can there be a sufficient current flow through the resistor R5 such that the trigger voltage required for triggering the thyristor T4 is present there. Under static conditions, that is to say with slowly changing output currents or output voltages, the voltage present at the ZENER diode D2 must consequently always lie below the breakdown voltage of the latter. This is achieved by the ZENER diode D2 being chosen such that its breakdown voltage is much greater than the gate threshold voltage required for blocking the control transistor T1. This is so since then, when there is a rise in the voltage rising across the ZENER diode D2, this transistor T1 is already fully blocked even before the breakdown voltage of the ZENER diode D2 is reached, and consequently a current flow through R5 can occur as a result of the transistor T3 becoming conductive.

Under dynamic conditions, that is to say when there are input voltage and/or load fluctuations during the control operation, the voltage control must always be quicker than the driving mechanism of the thyristor T4. Voltage peaks must not cause triggering of the crowbar. The transistor T2 must always block before the current through D2 or R5 rises to the extent that the gate voltage at the thyristor can reach the value required for triggering.

In order to avoid this, lowpass filters are provided between the measuring circuit M and the trigger voltage generator Z or between the trigger voltage generator Z and the shorting circuit K. These effect a delay or a smoothing of the control signal S or the trigger voltage. In detail, these lowpass filters comprise the resistor R4 and the capacitor C2, which is connected between the base of the transistor T3 and the ZENER diode D2. The capacitor C2 consequently has a smoothing effect.

The second lowpass filter is located between the collector of the transistor T3, which provides the trigger voltage, and the gate of the thyristor T4. The gate voltage of the thyristor T4 is consequently only reached when the capacitor C3 is charged.

The variant presented in FIG. 2 corresponds substantially to the circuit discussed above that is represented in FIG. 1. However, this circuit not only has a voltage-limiting effect but also a current-limiting effect. A measuring resistor R8 is connected into the output circuit. The measuring voltage drop across the measuring resistor R8 and proportional to the output current $I_A$ is picked off via the resistor R7, which serves substantially for increasing the impedance. This measuring voltage is present at the base of the transistor T2. The collector voltage of the transistor T2, which forms the control signal S, is consequently dependent on the voltage picked off at the measuring resistor R8. Therefore, not only is this circuit used for detecting if the maximum permissible voltage is exceeded, by the voltage rising at R2 after exceeding the breakdown voltage of D1, but the circuit concept can also be used for current limitation. Here, too, the voltage rise at R2 is used. In this case, however, this voltage rise is not produced by the current flow through D1, but by the voltage drop across the measuring resistor R8. The further operating principle then corresponds to that already explained above with respect to the voltage limitation. The rise of the collector voltage of the transistor T2 causes a rise of the gate voltage of the final control element T1, with the consequence that the output voltage $U_A$ or the output current $I_A$ is reduced. Here, too, the current limitation takes place before the triggering of the crowbar.

It is regarded as a significant success of the development according to the invention of a protective circuit of the prior art that both the threshold voltage of the limiting circuit and the threshold voltage of the shorting circuit are defined by a single component, that is to say the ZENER diode D1. There is no need for two components connected in series and affected by tolerances. The use of a commonly used threshold-determining component for both the final control or latch element T1 and for the shorting circuit K has the consequence that the guaranteed output voltage can be brought closer to the safety voltage at which the crowbar triggers.

Figure 3:
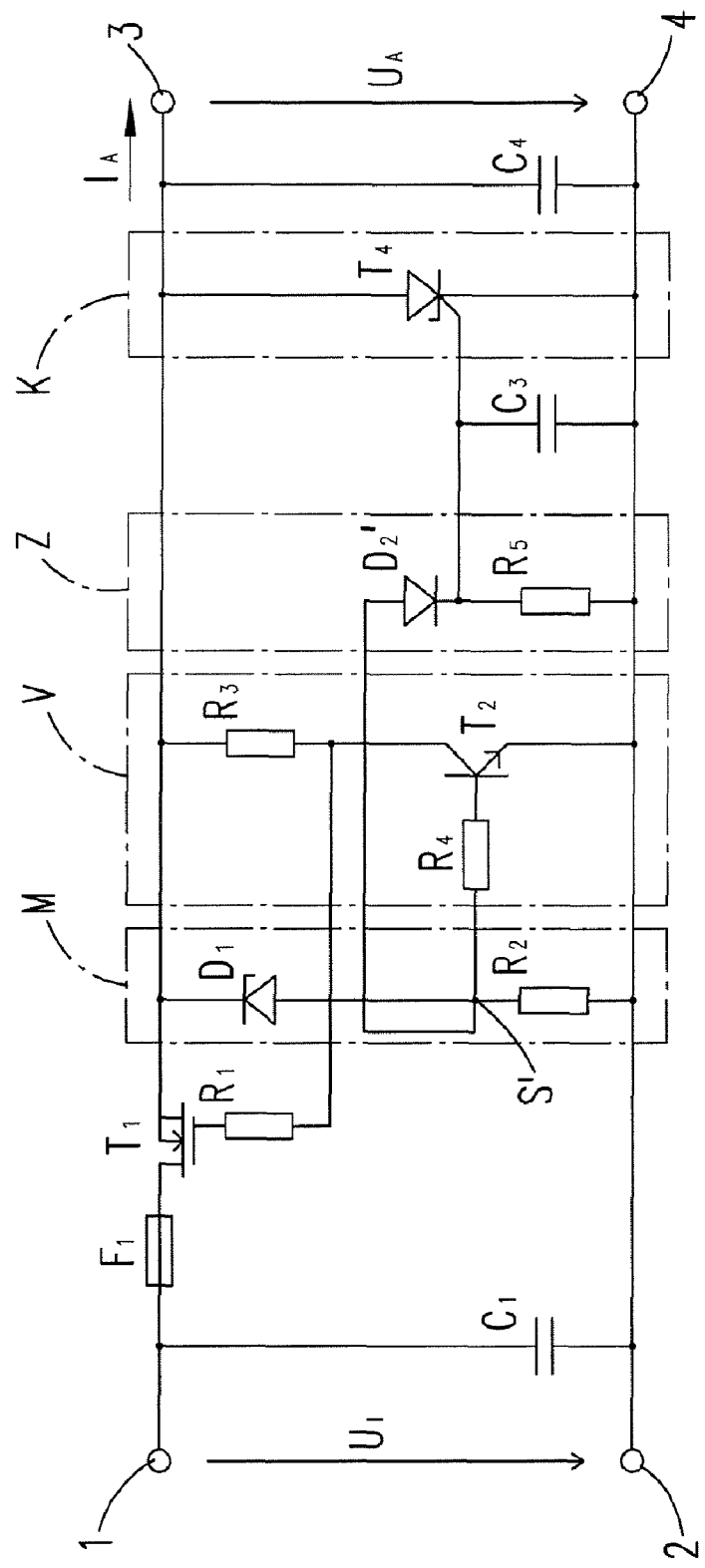
FIG. 3 shows the circuit diagram of a third exemplary embodiment.

The variant represented in FIG. 3 corresponds substantially to the circuit represented in FIG. 1. In the case of this exemplary embodiment, the control signal S', with which the field-effect transistor T1 or the trigger generator Z is driven, is an unamplified voltage, to be specific the voltage drop across the resistor R2. The resistor R2 is connected in series with the ZENER diode D1. If a voltage that is greater than the ZENER voltage of the ZENER diode D1 is present at the output terminals 3, 4, there is a voltage drop across the resistor R2. This voltage represents the control signal S'.

The control signal S' is passed via the resistor R4 to the base of the transistor T2. As already described with respect to the circuit of FIG. 1, the emitter voltage of the transistor T2 is brought via the resistor R1 to the gate of the field-effect transistor T1. The gate of the field-effect transistor T1 is electronically driven identically to the way in which it is driven in the case of the exemplary embodiment according to FIG. 1.

Unlike in the case of the two exemplary embodiments described above, however, now the voltage drop directly across the ZENER diode D1, which corresponds to the control signal S', is passed to the trigger generator Z. A diode D2' is polarized in the direction of the current, so that the threshold value of the shorting voltage is higher than the limiting voltage that corresponds to the ZENER voltage D1 by the voltage of the PN junction of the diode D2'. This circuit contains fewer components than the two circuits discussed above.

The trigger voltage drop is also across the resistor R5 in the case of this circuit. A voltage drop is only present there if the voltage present between the output terminals 3, 4 is higher than the sum of the ZENER voltage of the ZENER diode D1 and the voltage drop across the diode D2'.

For damping and to avoid faulty switching operations, here, too, a damping capacitor C3 is provided between the gate of the thyristor T4 and the output terminal 4. Also in the case of this circuit, the damping element may take the form of an RC element.

The switching interval brought about by the diode D2' ensures that, before the triggering of the trigger generator, an electronic voltage limitation can take place and the trigger generator only triggers if the electronic voltage limitation fails.

The circuit represented in FIG. 3 may also be supplemented by additional resistors R7 and R8, as are known from FIG. 2, in order that a current limitation is also brought about.

The solutions represented in the drawings show a measuring circuit M in which all the elements, that is to say in particular the measuring ZENER diode D1 and a measuring resistor R8, are disposed between the self-conducting field-effect transistor T1 and the shorting circuit K. Seen in the direction of the current, all the elements of the measuring circuit M consequently lie downstream of the field-effect transistor T1. The output voltage is picked off on the secondary side of the field-effect transistor T1. The same applies to the output current.

The invention claimed is:

1. Protective circuit for an electrical device operated in particular in an explosion-hazard area, with a limiting circuit connected downstream of a pair of input terminals for limiting an output voltage present at a pair of output terminals and/or an output current delivered at the output terminals below a threshold value and a shorting circuit, which shorts the output or input terminals when the threshold value is exceeded, a control signal that controls the limitation originating from the same place as a signal that triggers the shorting circuit, and with a measuring circuit, which uses the output voltage or the output current to provide the control signal, which is fed on the one hand to a final control element for reducing the output voltage or the output current and on the other hand to the shorting circuit, the measuring circuit comprising a ZENER diode and/or a measuring resistor and the control signal being a voltage that is in particular a transistor-amplified or impedance-converted voltage, characterized in that the final control element is a self-conducting field-effect transistor, at the gate of which the control signal is present, and the measuring circuit is connected downstream of the field-effect transistor in the direction of current flow;

a trigger voltage generator for supplying the shorting circuit with a trigger voltage if the control signal present at the input of the trigger voltage generator exceeds a predetermined threshold value;

wherein the threshold value of the trigger voltage generator is defined by the sum of the voltage drops across the Zener diode and a diode of the trigger voltage generator subjected to the control signal in a conducting direction; and wherein the dimensioning of the electronic components of the measuring circuit and the trigger voltage generator is chosen such that, when the measuring circuit and the field-effect transistor are working properly, the control voltage present at the trigger voltage generator is always less than the threshold value of the trigger voltage generator.

2. Protective circuit according to claim 1, characterized in that the threshold value is co-determined by a ZENER diode associated with the trigger generator.

3. Protective circuit according to claim 1, characterized by at least one electronic delay element between the measuring circuit and the shorting circuit.

4. Protective circuit according to claim 3, characterized in that the delay element is an RC element.

5. Protective circuit according to claim 1, characterized by a delay element disposed between the measuring circuit and the trigger voltage generator.

6. Protective circuit according to claim 1, characterized by a delay element disposed between the trigger voltage generator and the shorting circuit.

7. Protective circuit according to claim 1, characterized in that the shorting circuit comprises a thyristor.

8. Protective circuit according to claim 1, characterized by a fuse that blows when there is a short-circuit.

9. Protective circuit according to claim 1, characterized in that the gate/source threshold value of the field-effect transistor forming the final control element is less than the control signal that is required for producing a trigger voltage triggering the shorting circuit and is present at the trigger voltage generator.

10. Protective circuit according to claim 9, characterized in that a ZENER diode associated with the trigger voltage generator has a break-down voltage that is much greater than the gate threshold voltage required for blocking the field-effect transistor.

11. Protective circuit according to claim 1, characterized in that the control signal is a voltage drop across a resistor connected in series with a ZENER diode.

12. Protective circuit according to claim 1, characterized by an amplifier circuit, with which the control signal for producing a drive voltage for the final control element is amplified.

13. Protective circuit for an electrical device operated in an explosion-hazard area, comprising:
- a limiting circuit connected downstream in the direction of current flow of a pair of input terminals for limiting an output voltage present at a pair of output terminals and/or an output current delivered at the output terminals below a first threshold value;
- a final control element formed by a self-conducting field-effect transistor;
- a fuse connected between one of said input terminals and the final control element;
- a shorting circuit, which shorts the output terminals when said first threshold value is exceeded;
- a measuring circuit, to provide a control signal, which measuring circuit is connected downstream in the direction of current flow to the final control element,
- a trigger voltage generator comparing said control signal with a second threshold voltage for supplying the shorting circuit with a trigger voltage, if said control signal exceeds said second threshold voltage, wherein the gate source threshold value of the field-effect transistor is less than the control signal that is required for producing the trigger voltage triggering the shorting circuit, and wherein in case
a) limiting the output voltage the measuring circuit uses the output voltage to provide said control signal and has a first ZENER diode with a first breakdown voltage, wherein said control signal is present if the output voltage exceeds said first break down voltage and is fed to the gate of the field-effect transistor for reducing said output voltage, and/or
b) in case limiting the output current the measuring circuit uses the output current to provide said control signal and has a measuring resistor connected into the output circuit for providing a measuring voltage which drops across the measuring resistor, wherein said control signal is proportional to the measuring voltage and is fed to the gate of the field-effect transistor for reducing said output current, wherein a diode of the trigger voltage generator is subjected to the control signal in the conducting direction.

14. Protective circuit according to claim 13 further including a second Zenerdiode, wherein the breakdown voltage of the second Zenerdiode is the second threshold voltage.

* * * * *